(12) United States Patent
Fukumoto et al.

(10) Patent No.: US 8,654,351 B2
(45) Date of Patent: Feb. 18, 2014

(54) OFFSET AMOUNT CALIBRATING METHOD AND SURFACE PROFILE MEASURING MACHINE

(75) Inventors: Yasushi Fukumoto, Kawasaki (JP); Koichi Komatsu, Kawasaki (JP); Fumihiro Takemura, Kawasaki (JP); Sadaharu Arita, Kure (JP); Kotaro Hirano, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 713 days.

(21) Appl. No.: 12/900,788

(22) Filed: Oct. 8, 2010

(65) Prior Publication Data

US 2011/0085177 A1    Apr. 14, 2011

(30) Foreign Application Priority Data

Oct. 13, 2009 (JP) .................. 2009-236122

(51) Int. Cl.
    *G01B 11/30*      (2006.01)

(52) U.S. Cl.
    USPC ............ 356/601; 356/401; 356/600; 356/497

(58) Field of Classification Search
    USPC .................. 356/497–514, 600–608, 399–401
    See application file for complete search history.

(56) References Cited

U.S. PATENT DOCUMENTS

| 5,955,661 A | 9/1999 | Samsavar et al. |
| 6,067,165 A * | 5/2000 | Matsumiya et al. .......... 356/401 |
| 2005/0151963 A1 | 7/2005 | Pulla et al. |

FOREIGN PATENT DOCUMENTS

| DE | 10 2006 014 509 A1 | 9/2007 |
| JP | B2-4-78929 | 12/1992 |
| JP | A-5-87562 | 4/1993 |
| JP | A-10-62155 | 3/1998 |
| JP | B2-2794258 | 6/1998 |
| JP | A-11-351858 | 12/1999 |
| JP | A-2000-266534 | 9/2000 |
| JP | A-2003-097939 | 4/2003 |
| JP | B2-3482362 | 10/2003 |
| JP | B2-3602965 | 10/2004 |
| JP | B2-3612068 | 10/2004 |
| JP | B2-3678915 | 5/2005 |
| JP | B2-3678916 | 5/2005 |
| JP | A-2007-114000 | 5/2007 |
| JP | A-2008-524565 | 7/2008 |

OTHER PUBLICATIONS

Extended European Search Report issued in European Application No. 10187328.9 on Jan. 26. 2011.

(Continued)

*Primary Examiner* — Gregory J Toatley
*Assistant Examiner* — Iyabo S. Alli
(74) *Attorney, Agent, or Firm* — Oliff PLC

(57) ABSTRACT

An offset amount calibrating method that obtains the offset amount between a contact-type detector and an image probe for a surface profile measuring machine is provided. The method includes: setting on a stage a calibration jig that has a surface being provided with a lattice pattern with a level difference; measuring the lattice pattern of the calibration jig by the contact-type detector to obtain a first reference position of the lattice pattern; capturing the image of the lattice pattern of the calibration jig by the image probe to obtain a second reference position of the lattice pattern; and obtaining the offset amount from a difference between the first and second reference positions.

2 Claims, 14 Drawing Sheets

(56) References Cited

OTHER PUBLICATIONS

U.S. Appl. No. 12/900,867, filed Oct. 8, 2010 in the name of Sadayuki Matsukiya.

U.S. Appl. No. 12/900,834, filed Oct. 8, 2010 in the name of Tomotaka Takahashi.

May 28, 2013 Office Action issued in Japanese Patent Application No. 2009-236122 (with translation).

* cited by examiner

OFFSET AMOUNT CALIBRATING METHOD AND SURFACE PROFILE MEASURING MACHINE

The entire disclosure of Japanese Patent Application No. 2009-236122 filed Oct. 13, 2009 is expressly incorporated by reference herein.

BACKGROUND OF THE INVENTION

1. Field of the Invention

The present invention relates to a surface profile measuring machine equipped with a contact-type detector with a stylus and an image probe and to an offset amount calibrating method for obtaining the offset amount between the contact-type detector and the image probe.

2. Description of Related Art

There has been known a surface profile measuring machine in which a stylus is moved along a surface of an object while being in contact with the surface of the object. The displacement of the stylus due to the surface profile or surface roughness of the object is detected, thereby measuring the surface profile, surface roughness and the like of the object based on the displacement of the stylus (see, for instance, Patent Literature: JP-A-05-087562).

In such a typical surface profile measuring machine, in order to measure the surface profile, surface roughness and the like of an object, while visually checking and adjusting the relative position between the tip end of a stylus and a measurement area on the object, an operator sets the tip end of the stylus at a measurement starting position on the object and then moves the stylus along the surface of the object. The surface texture such as the surface profile and the surface roughness of the object is measured based on the up-and-down movement of the stylus due to the surface profile, surface roughness and the like of the object.

Due to a recent tendency for measuring minute and thin objects, objects or measuring spots are downsized. Accordingly, the above setting operation of a stylus, which is quite complicated and requires a long time, places a large burden on an operator.

In addition, some types of objects may interfere with (collide with) a stylus to damage the stylus or the objects.

Accordingly, the Applicant(s) has worked on the development of a surface profile measuring machine equipped with not only a contact-type detector with a stylus for contacting with a surface of an object but also an image probe used to capture an image of the surface of the object.

In such a machine, the image of the object is initially taken by the image probe. When a measurement starting position on the object is designated based on the taken image of the object, the movement course of a relative movement mechanism is calculated and stored so that the stylus of the contact-type detector is in contact with the measurement starting position on the object. In response to a command for measurement, the relative movement mechanism is moved in accordance with the stored movement course, so that the stylus of the contact-type detector is automatically brought into contact with the measurement starting position on the object.

In this manner, the stylus of the contact-type detector can be automatically set at the measurement starting position on the object. In other words, an operator does not have to set the tip end of the stylus at the measurement starting position on the object while visibly checking and adjusting the position of the tip end of the stylus relative to the measurement starting position on the object as in a typical apparatus. Accordingly, the stylus can be prevented from interfering with the object while reducing the burden on the operator.

However, the contact-type detector with the stylus and the image probe are offset from each other in the same system for physical and structural reasons.

Therefore, at the time of switching from the image probe to the contact-type detector or switching from the contact-type detector to the image probe, the offset amount between the contact-type detector and the image probe has to be corrected. Thus, it is important for realizing highly-accurate measurement to accurately obtain the offset amount between the contact-type detector and the image probe.

SUMMARY OF THE INVENTION

An object of the present invention is to provide an offset amount calibrating method for a surface profile measuring machine equipped with a contact-type detector and an image probe, being capable of accurately obtaining the offset amount between the contact-type detector and the image probe, and a surface profile measuring machine using the same.

According to an aspect of the invention, an offset amount calibrating method for a surface profile measuring machine including: a stage on which an object is mounted; a contact-type detector being provided with a stylus that is brought into contact with a surface of the object; an image probe that captures an image of the surface of the object; a relative movement mechanism that relatively moves the stage against the contact-type detector and the image probe and moves the contact-type detector and the image probe against the stage; and a controller that controls an operation of the relative movement mechanism and executes processing on measurement data obtained by the contact-type detector and image data obtained by the image probe, the method obtaining an offset amount between the contact-type detector and the image probe, the method includes: setting on the stage a calibration jig that has a surface being provided with a calibration pattern with a level difference; measuring the calibration pattern of the calibration jig by the contact-type detector to obtain a first reference position of the calibration pattern; capturing an image of the calibration pattern of the calibration jig by the image probe to obtain a second reference position of the calibration pattern; and calculating a difference between the first reference position and the second reference position to obtain the offset amount.

With this arrangement, the calibration jig provided with the calibration pattern is set on the stage (calibration jig setting step) and then calibration pattern of the calibration jig is measured by the contact-type detector to obtain the first reference position of the calibration pattern (first calibration measuring step). The image of the calibration pattern of the calibration jig is captured by the image probe to obtain the second reference position of the calibration pattern (second calibration measuring step). Finally, the offset amount is obtained from the difference between the first reference position obtained in the first calibration measuring step and the second reference position obtained in the second calibration measuring step (offset amount calculating step).

As described above, the offset amount is obtained from the difference between the first reference position of the calibration pattern obtained from the measurement by the contact-type detector and the second reference position of the calibration pattern obtained from the image captured by the image probe. Thus, the offset amount between the contact-type detector and the image probe can be accurately and easily obtained.

In the method, it is preferable that the calibration jig includes: a base board; and a calibration pattern having four sub-areas divided by two intersecting straight lines on a surface of the base board, surfaces of a first diagonal pair of the sub-areas being formed at a higher level than surfaces of a second diagonal pair of the sub-areas, the stylus of the contact-type detector is moved across boundaries between the sub-areas of the calibration jig to measure positions of level differences between the sub-areas at plural spots and obtained measurement values of the positions of the level differences are approximated by two first linear lines to obtain the first reference position of the calibration pattern from coordinates of an intersection between the two first linear lines in the first calibration measuring step, and an image of the sub-areas of the calibration jig is captured by the image probe to detect edges of the sub-areas at plural spots and obtained detection values of the edges are approximated by two second linear lines to obtain the second reference position of the calibration pattern from the coordinates of the intersection between the two second linear lines in the second calibration measuring step.

With this arrangement, by using the calibration jig provided with the calibration pattern having the four sub-areas divided by the two intersecting straight lines on the surface of the base board, the first diagonal pair of the sub-areas formed at a higher level than the surfaces of the second diagonal pair of the sub-areas, the stylus of the contact-type detector is moved across the boundaries between the sub-areas of the calibration jig to measure the positions of the level differences between the sub-areas at the plural spots in the first calibration measuring step. The measurement values of the level differences are approximated by the first linear lines to obtain the coordinates of the intersection between the first linear lines, thereby obtaining the first reference position of the calibration pattern.

In the second calibration measuring step, the image of the sub-areas of the calibration jig is captured by the image probe (i.e., the boundaries between the sub-areas are scanned), thereby detecting the edges between the sub-areas. The detection values of the edges are approximated by the second linear lines to obtain the coordinates of the intersection between the second linear lines, thereby obtaining the second reference position of the calibration pattern.

Thus, by using the calibration jig provided with the calibration pattern having the four sub-areas divided by the two intersecting straight lines on the surface of the base board, the first diagonal pair of the sub-areas formed at a higher level than the surfaces of the second diagonal pair of the sub-areas, the offset amount between the contact-type detector and the image probe can be accurately obtained in a relatively simple and low-cost manner.

In the method, it is preferable that the calibration jig includes: a base board; and a calibration pattern being formed on a surface of the base board, the calibration pattern having a circular area, a surface of inside or outside of the circular area being formed at a higher level than a surface of the other of the inside and the outside, the stylus of the contact-type detector is moved across the circular area of the calibration jig to measure a position of a level difference of the circular area at three or more spots and obtained measurement values of the position of the level difference are approximated by a first circle to obtain the first reference position of the calibration pattern from central coordinates of the first circle in the first calibration measuring step, and an image of the circular area of the calibration jig is captured by the image probe to detect an edge of the circular area at three or more spots and obtained detection values of the edge are approximated by a second circle to obtain the second reference position of the calibration pattern from the central coordinates of the second circle in the second calibration measuring step.

With this arrangement, by using the calibration jig provided with the calibration pattern formed on the surface of the base board and having the circular area of which inside or outside is formed at a higher level than the surface of the other of the inside and the outside, the stylus of the contact-type detector is moved from the inside to the outside of the circular area to measure the position of the level difference of the circular area at three or more spots in the first calibration measuring step. The measurement values of the level difference are approximated by the first circle to obtain the central coordinates of the first circle, thereby obtaining the first reference position of the calibration pattern.

In the second calibration measuring step, the image of the circular area of the calibration jig is captured by the image probe (i.e., the boundary between the inside and the outside of the circular area is scanned), thereby detecting the edge of the circular area at three or more spots. The detection values of the edge are approximated by the second circle to obtain the central coordinates of the second circle, thereby obtaining the second reference position of the calibration pattern.

Thus, by using the calibration jig provided with the calibration pattern formed on the surface of the base board and having the circular area of which inside or outside is formed at a higher level than the surface of the other of the inside and the outside, the offset amount between the contact-type detector and the image probe can be accurately obtained in a relatively simple and low-cost manner.

According to another aspect of the invention, a surface profile measuring machine includes: a stage on which an object is mounted; a contact-type detector being provided with a stylus that is brought into contact with a surface of the object; an image probe that captures an image of the surface of the object; a relative movement mechanism that relatively moves the stage against the contact-type detector and the image probe and moves the contact-type detector and the image probe against the stage; a controller that controls an operation of the relative movement mechanism and executes processing on measurement data obtained by the contact-type detector and image data obtained by the image probe; and an offset amount storage unit that stores an offset amount obtained by any one of the above offset amount calibrating methods, in which the controller includes: a movement course calculating unit that, when a measurement starting position on the object is designated based on the image of the object taken by the image probe, calculates and stores a movement course of the relative movement mechanism in consideration of the offset amount stored in the offset amount storage unit as a compensation value, so that the stylus of the contact-type detector is brought into contact with the measurement starting position on the object; and a stylus setting unit that enables the relative movement mechanism to move along the movement course calculated by the movement course calculating unit.

With this arrangement, the image of the object is initially taken by the image probe. Subsequently, when a measurement starting position on the object is designated based on the taken image of the object, the movement course calculating unit calculates and stores the movement course of the relative movement mechanism in consideration of the offset amount stored in the offset amount storage unit as a compensation value so that the stylus of the contact-type detector is brought into contact with the measurement starting position on the object. When measurement is performed later, the relative movement mechanism is moved in accordance with the movement course calculated by the movement course calculating unit. In other words, the relative movement mechanism is moved in accordance with the stored movement course, thereby bringing the stylus of the contact-type detector into contact with the measurement starting position on the object.

In this manner, the stylus of the contact-type can be automatically set at the measurement starting position on the object. In other words, an operator does not have to set the tip end of the stylus at the measurement starting position on the object while visibly checking and adjusting the position of the tip end of the stylus relative to the measurement starting position on the object as in a typical apparatus. Therefore, the stylus can be prevented from interfering with the object while reducing the burden on the operator.

DETAILED DESCRIPTION OF PREFERRED EMBODIMENTS

Description of Surface Profile Measuring Machine (Reference to FIGS. 1 to 5)

Figure 1:
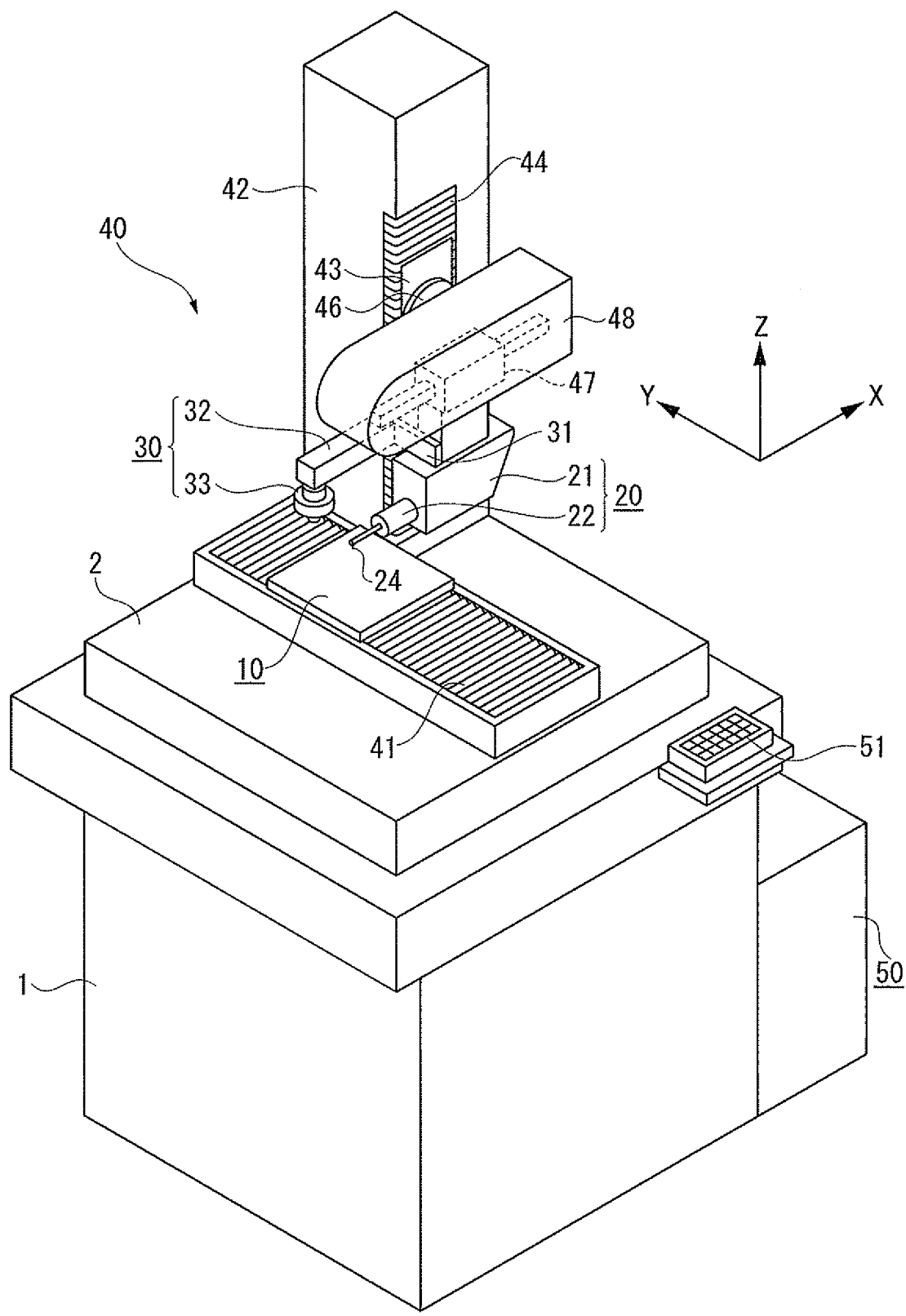
FIG. 1 is a perspective view showing a surface profile measuring machine according to an exemplary embodiment of the present invention.
Figure 2:
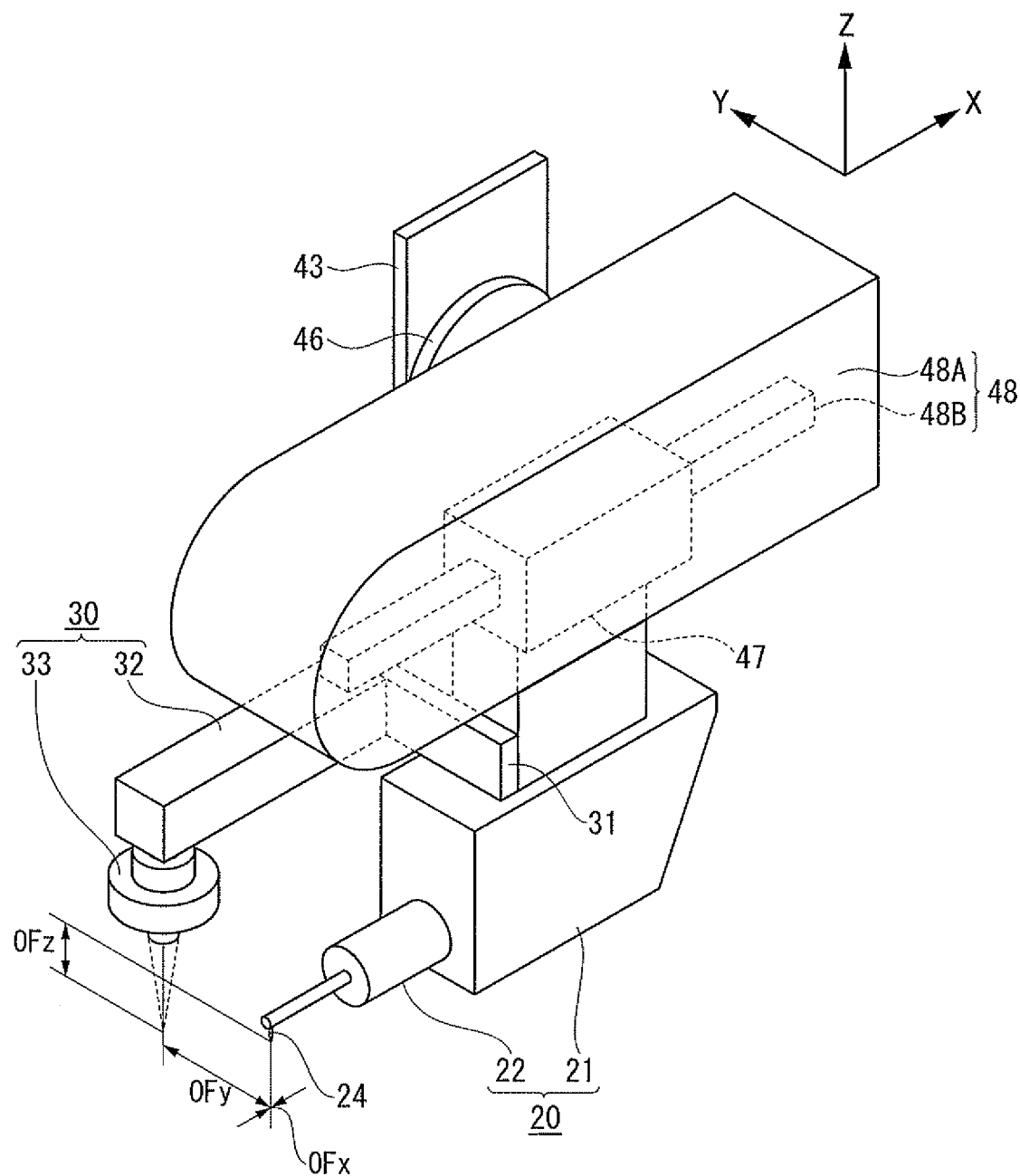
FIG. 2 is an enlarged perspective view showing a contact-type detector and an image probe according to the exemplary embodiment.

As shown in FIGS. 1 and 2, a surface profile measuring machine according to an exemplary embodiment of the present invention includes: a mount stand 1; a base 2 being fixed on the upper surface of the mount stand 1; a stage 10 being mounted on the base 2, the stage 10 having an upper surface on which an object is mounted; a contact-type detector 20 being provided with a stylus 24 that is brought into contact with a surface of the object; an image probe 30 that captures the image of the surface of the object; a relative movement mechanism 40 that relatively moves the stage 10 against the contact-type detector 20 and the image probe 30 and moves the contact-type detector 20 and the image probe 30 against the stage 10; and a controller 50.

The relative movement mechanism 40 includes: a Y-axis driving mechanism 41 as a first movement mechanism being located between the base 2 and the stage 10 to move the stage 10 in a horizontal direction (Y-axis direction); a column 42 that stands upright on the upper surface of the base 2; a Z-slider 43 as a lifting member being provided to the column 42 movably in an up-and-down direction (Z-axis direction); a Z-axis driving mechanism 44 as a second movement mechanism that drives the Z-slider 43 to move in the up-and-down direction; a rotary plate 46 being provided to the Z-slider 43 via a rotation mechanism 45 (see FIG. 5) to be rotatable around the Y-axis; an X-slider 47 as a slide member being provided to the rotary plate 46 to be movable in a direction (X-axis direction) perpendicular to the movement direction of the stage 10 (Y-axis direction) and the lifting direction of the Z-slider 43 (Z-axis direction); and an X-axis driving mechanism 48 as a third movement mechanism that drives the X-slider 47 to move in the X-axis direction.

In this exemplary embodiment, the contact-type detector 20 and the image probe 30 are attached to the X-slider 47. Therefore, the relative movement mechanism 40 is provided by a three-dimensional movement mechanism that includes the Y-axis driving mechanism 41 that moves the stage 10 in the Y-axis direction, the Z-axis driving mechanism 44 that moves the contact-type detector 20 and the image probe 30 in the Z-axis direction, and the X-axis driving mechanism 48 that moves the contact-type detector 20 and the image probe 30 in the X-axis direction.

Each of the Y-axis driving mechanism 41 and the Z-axis driving mechanism 44 is provided by, for instance, a feed screw mechanism (not shown) that includes a ball screw shaft and a nut member screwed to the ball screw shaft.

The X-axis driving mechanism 48 includes a guide rail 48B being provided to a driving mechanism body 48A in parallel with the X-axis direction to movably support the X-slider 47, a driving source (not shown) that drives the X-slider 47 to reciprocate along the guide rail 48B, and the like.

Figure 3:
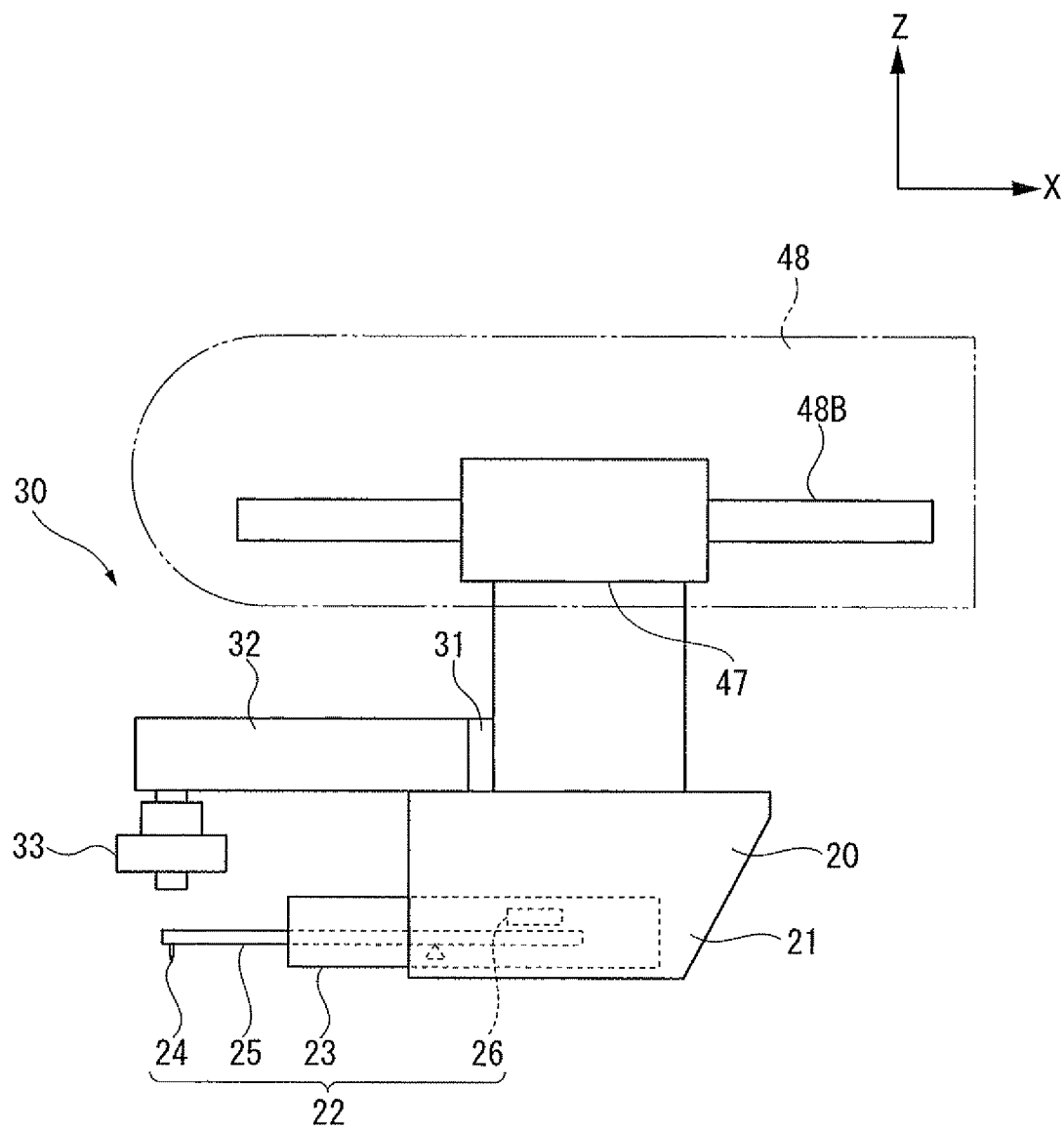
FIG. 3 is a front view showing the contact-type detector and the image probe according to the exemplary embodiment.

As shown in FIG. 3, the contact-type detector 20 includes a detector body 21 being hung and supported on the X-slider 47, and a contact-type probe 22 being supported on the detector body 21 in parallel with the X-axis direction. The contact-type probe 22 includes a probe body 23, an arm 25 being swingably supported on the probe body 23 and being provided with the stylus 24 at a tip end thereof, and a detecting portion 26 that detects the swing amount of the arm 25.

The image probe 30 includes a cylindrical probe body 32 being integrally connected to the X-slider 47 via a connecting member 31 along with the contact-type detector 20, and a probe head 33 being downwardly supported on the tip end of the probe body 32.

Figure 4:
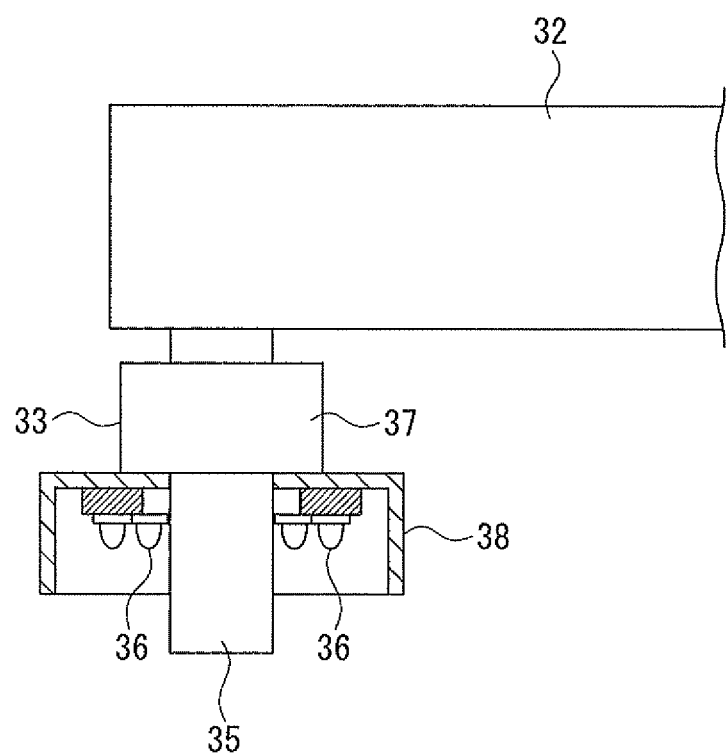
FIG. 4 shows the image probe according to the exemplary embodiment.

As shown in FIG. 4, the probe head 33 includes an objective lens 35, an LED 36 as a light source being located on the outer periphery of the objective lens 35, a CCD sensor 37 that receives reflected light from the object that has passed through the objective lens 35 to capture the image of the object, and a cover 38 that covers the LED 36 and the surroundings thereof.

The image probe 30 is located at a position offset relative to the contact-type detector 20. Specifically, as shown in FIG. 2, the focal point of the objective lens 35 of the image probe 30 is deviated downward in the Z-axis direction from the tip end of the stylus 24 of the contact-type detector 20 by an offset amount OFz and rearward in the Y-axis direction from the longitudinal axis of the stylus 24 by an offset amount OFy. Incidentally, the focal point is located at the same position in the X-axis direction as the longitudinal axis of the stylus 24 (i.e., at a position corresponding to an offset amount OFx=0).

Figure 5:
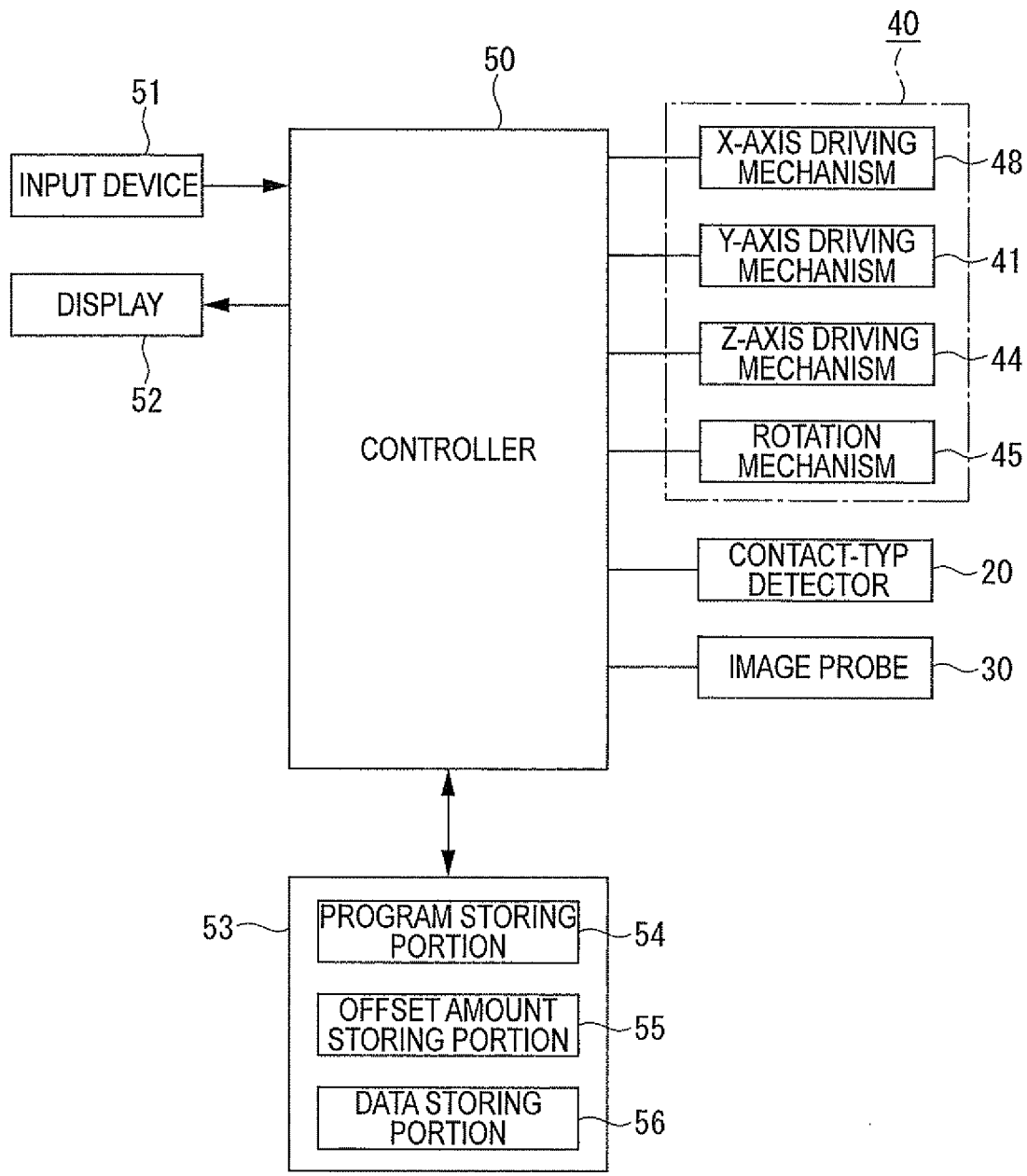
FIG. 5 is a block diagram showing a control system according to the exemplary embodiment.

As shown in FIG. 5, the controller 50 is connected to an input device 51, a display 52 and a storage 53 in addition to the relative movement mechanism 40, the contact-type detector 20 and the image probe 30.

The input device 51 is provided by, for instance, a portable keyboard, a joystick or the like and is used not only to input various kinds of operation commands and data but also to designate a position at which the stylus 24 is to be set (measurement starting position) in accordance with the image captured by the image probe 30.

The display 52 shows not only the image captured by the image probe 30 but also profile and/or roughness data obtained by the contact-type detector 20.

The storage 53 includes a program storing portion 54 that stores a measurement program and the like, an offset amount storing portion 55 as an offset amount storage unit that stores the offset amounts OFx, OFy and OFz between the stylus 24 of the contact-type detector 20 and the image probe 30, a data storing portion 56 that stores image data and measurement data obtained from measurement, and the like.

The controller 50 includes: a movement course calculating unit that, when the measurement starting position is designated based on the image of the object taken by the image probe 30 in accordance with the measurement program stored in the program storing portion 54, calculates and stores the movement course of the relative movement mechanism 40 in consideration of the offset amounts OFx, OFy and OFz stored in the offset amount storing portion 55 as compensation values, so that the stylus 24 of the contact-type detector 20 is brought into contact with the measurement starting position on the object; a stylus setting unit that drives the relative movement mechanism 40 along the movement course calculated by the movement course calculating unit; and a measurement performing unit that operates the relative movement mechanism 40 so that the contact-type detector 20 is moved relative to the object while the stylus 24 of the contact-type detector 20 is in contact with the object, thereby measuring the surface profile of the object.

The controller 50 further includes an edge detection function for detecting the edge of the object in the image of the object taken by the image probe 30, and an auto-focusing function for moving the objective lens 35 in the heigthwise direction of the object (Z-axis direction) so that the focal point of the objective lens is set at the surface of the object defined in the heigthwise direction to detect the heigthwise position of the object depending on the amount of the displacement of the objective lens 35. The edge detection function may be based on any known principle of detection but may use, for instance, a technique in which an average intensity (light intensity) in a direction perpendicular to the detection direction of the image probe 30 is obtained to detect a position at which the average intensity becomes equal to or below a preset threshold as the edge.

Figure 6:
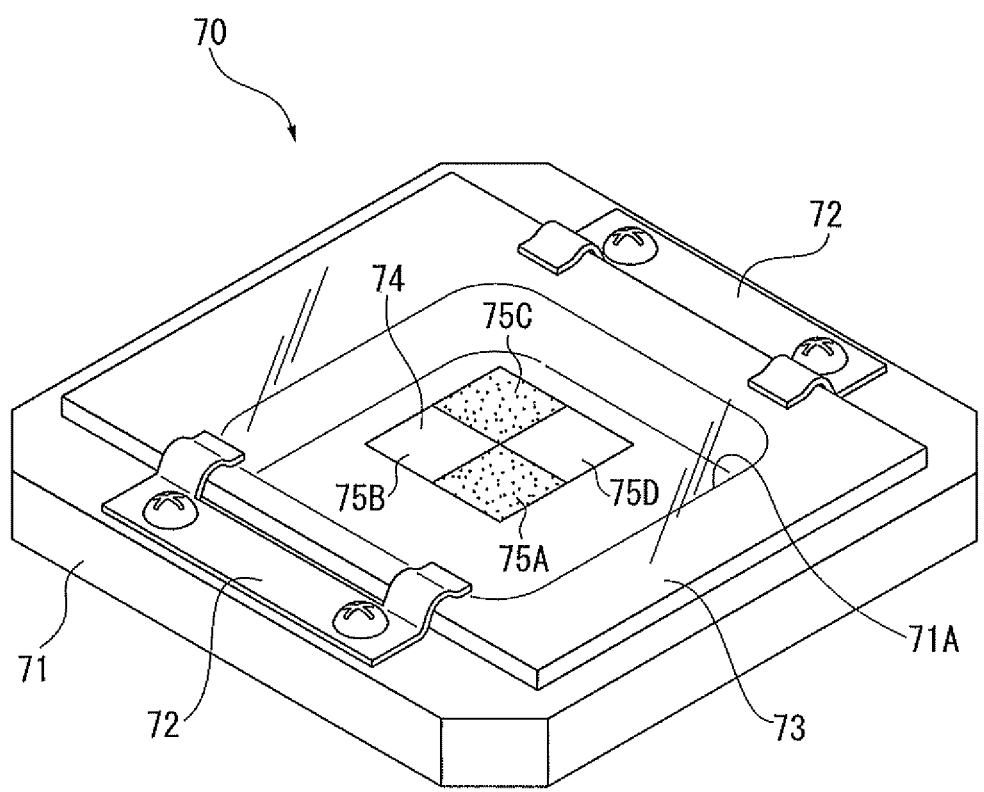
FIG. 6 is a perspective view showing a calibration jig used for an offset amount calibrating method according to the exemplary embodiment.
Figure 7:
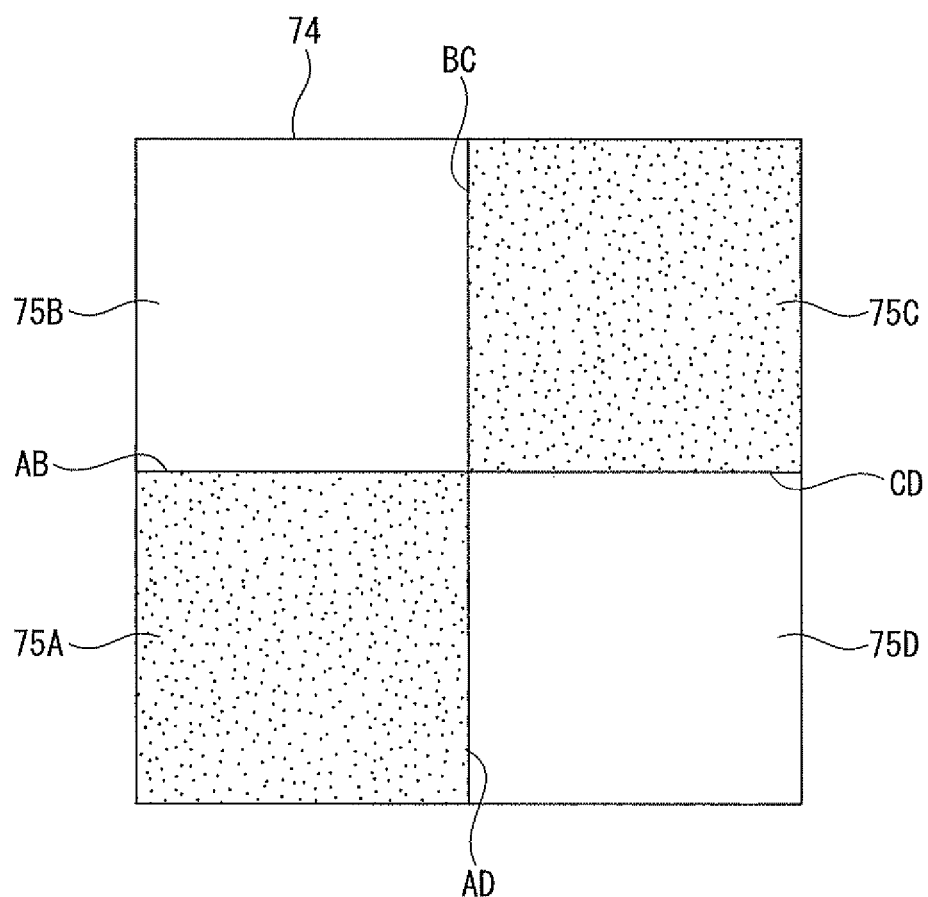
FIG. 7 shows a lattice pattern of the calibration jig used for the offset amount calibrating method according to the exemplary embodiment.

Description of Calibration Jig (Reference to FIGS. 6 to 7)

As shown in FIG. 6, the calibration jig 70 includes a fixing base 71 shaped in a substantially rectangular plate, a base board 73 made of glass, and two metal pieces 72 used for fixing the base board 73 on the fixing base 71.

The fixing base 71 defines an opening 71A at the center thereof so that the back surface of the base board 73 is raised off the stage 10.

The base board 73 is provided with a lattice pattern 74 as a calibration pattern having a level difference on the surface thereof. As shown in FIG. 7, the lattice pattern 74 has four sub-areas 75A, 75B, 75C and 75D that are divided from one another by the two intersecting straight lines (in this exemplary embodiment, two mutually-perpendicular straight lines). A first diagonal pair of sub-areas 75A and 75C are located at a higher level than the surfaces of a second diagonal pair of the sub-areas 75B and 75D. Specifically, the first diagonal pair of sub-areas 75A and 75C are each provided with a thin film made of Cr or the like having a thickness of approximately 1,100 angstroms, so that the lattice pattern 74 has level differences AB, BC, CD and AD between the sub-areas 75A, 75B, 75C and 75D.

Figure 8:
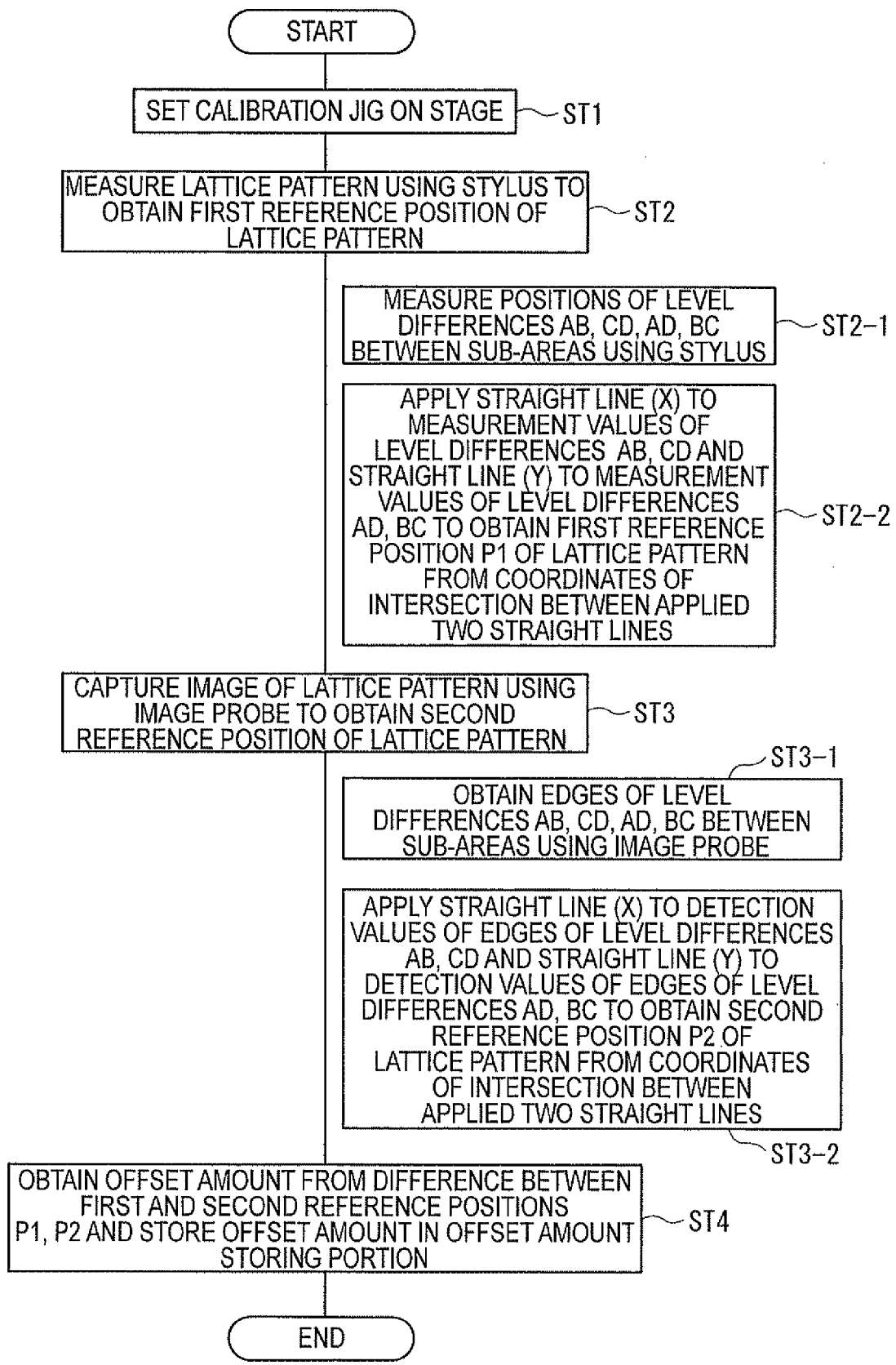
FIG. 8 is a flow chart showing a process of the offset amount calibrating method according to the exemplary embodiment.
Figure 9:
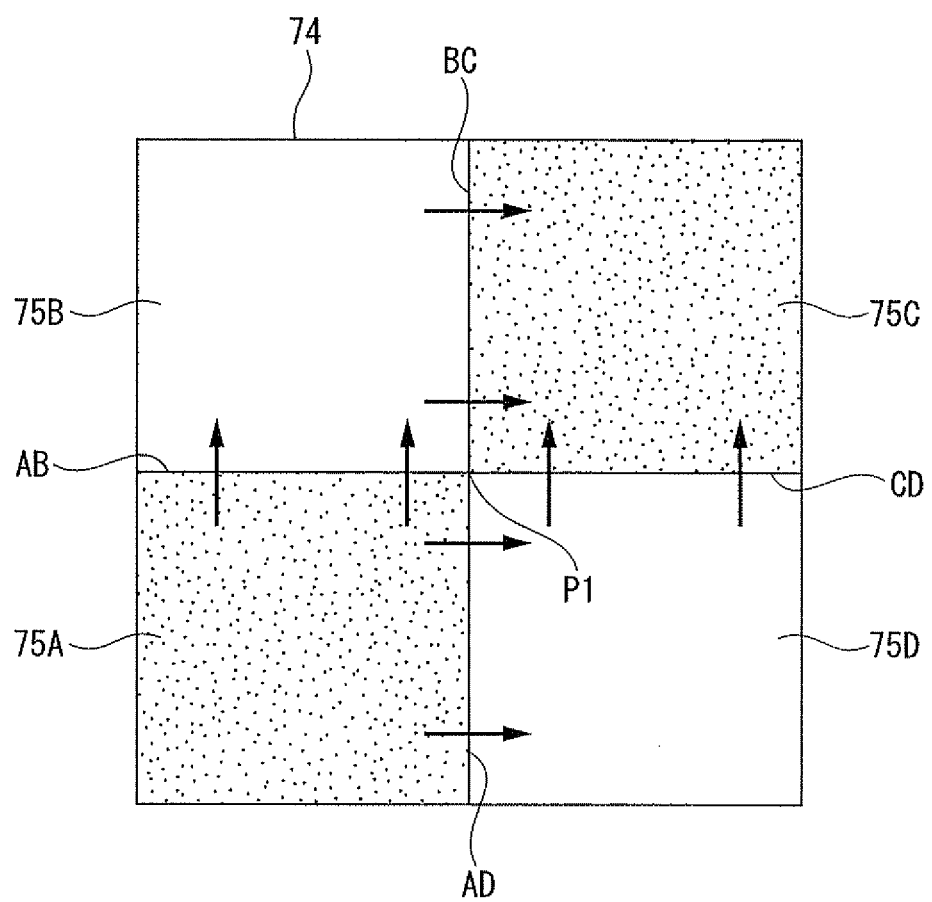
FIG. 9 shows a first measuring step of the offset amount calibrating method according to the exemplary embodiment.
Figure 10:
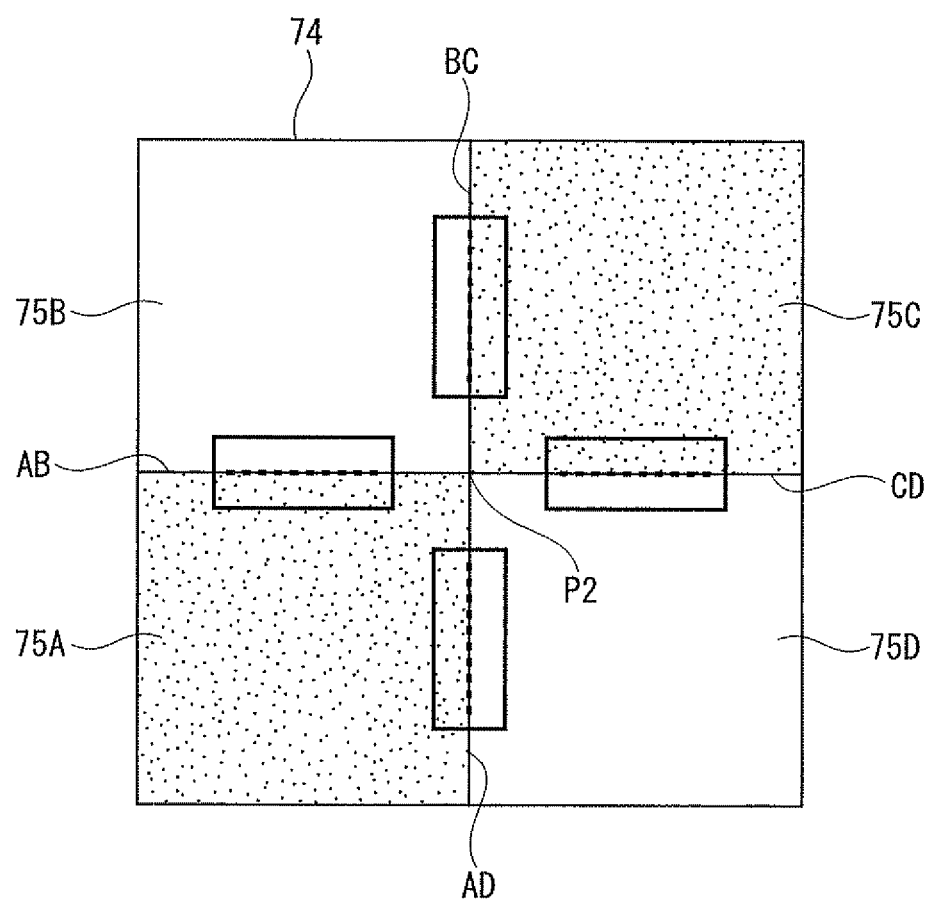
FIG. 10 shows a second measuring step of the offset amount calibrating method according to the exemplary embodiment.
Figure 11:
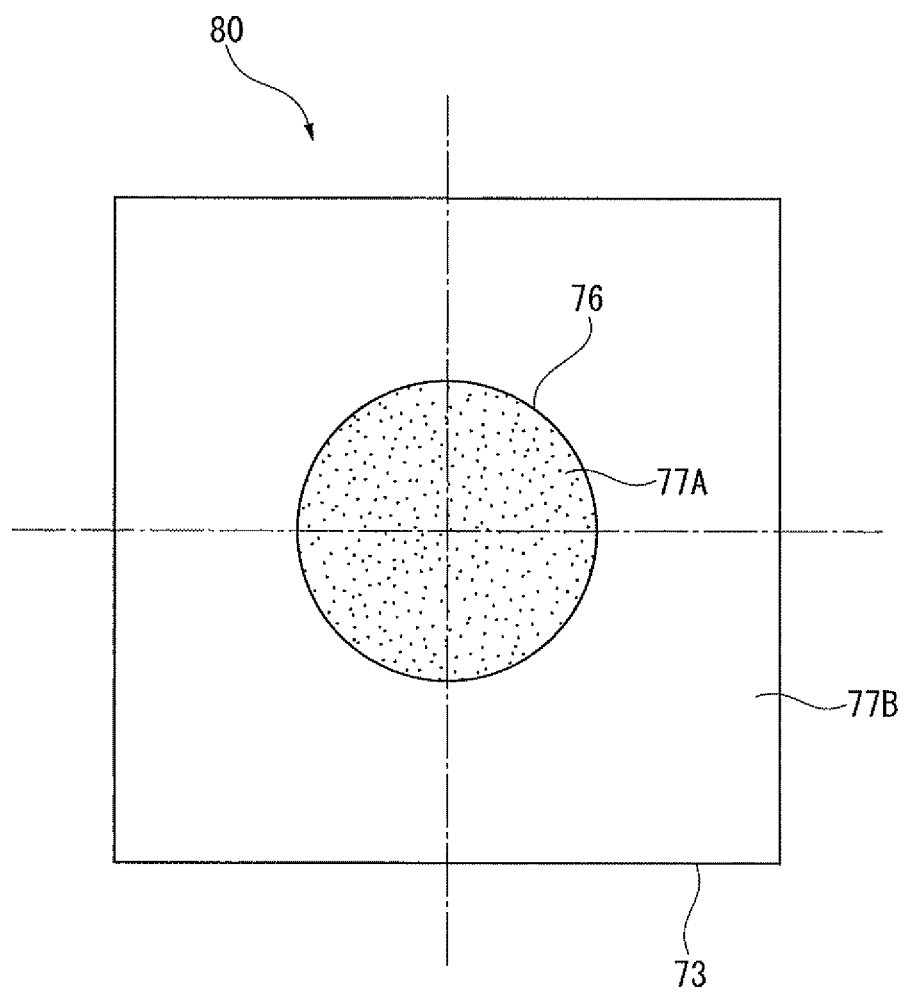
FIG. 11 shows another example of the calibration jig used for the offset amount calibrating method according to the exemplary embodiment.

Description of Offset Amount Calibrating Method (Reference to FIGS. 8 to 10)

A process for obtaining the offset amount between the contact-type detector 20 and the image probe 30 is performed in accordance with the flow chart shown in FIG. 8.

In a step (hereinafter referred to as "ST") 1, the calibration jig 70 is set on the stage 10 (calibrating jig setting step).

In ST 2, the lattice pattern 74 of the calibration jig 70 is measured by the stylus 24 of the contact-type detector 20 to obtain the reference position (the center position, in this exemplary embodiment) of the lattice pattern 74 (first calibration measuring step).

Specifically, as shown in FIG. 9, the stylus 24 of the contact-type detector 20 is moved to cross boundaries between the sub-areas 75A to 75D of the lattice pattern 74 to measure the positions of the level differences AB, CD and AD, BC at a plurality of (at least two or more) spots (ST 2-1). Straight lines X and Y are applied to the obtained measurement values of the positions of the level differences to obtain a first reference position P1 of the lattice pattern 74 from the coordinates of the intersection between the two straight lines X and Y (ST 2-2).

In ST 3, the image of the lattice pattern 74 of the calibration jig 70 is captured by the image probe 30 to obtain the reference position of the lattice pattern 74 (second calibration measuring step).

Specifically, as shown in FIG. 10, the image of the sub-areas 75A to 75D of the calibration jig 70 is captured by the image probe 30 to detect the level differences AB, CD, AD and BC between the sub-areas 75A to 75D, i.e., the positions of edges, at a plurality of (at least two or more) spots (ST 3-1). The straight lines X and Y are applied to the obtained detection values of the edges to obtain a reference position P2 of the lattice pattern 74 from the coordinates of the intersection between the two straight lines X and Y (ST 3-2).

In ST 4, a difference between the first reference position P1 obtained in the first calibration measuring step and the second reference position P2 obtained in the second calibrating measuring step is calculated (P 1-P2) to obtain an offset amount (offset amount calculating step) and the obtained offset amount is stored in the offset amount storing portion 55. In this manner, the calibration of the offset amount is completed.

Description of Measurement Operation

In order to measure an object, the image probe 30 captures the image of the object in response to a command from the input device 51. After storing the image data in the data storing portion 56, the image date of the object is displayed on the display 52.

When a measurement starting position (a position at which the stylus 24 of the contact-type detector 20 is first brought into contact) is designated by using the input device 51 in accordance with the image on the display 52, the controller 50 calculates the movement course of the relative movement mechanism 40 in consideration of the offset amounts OFx, OFy and OFz stored in the offset amount storing portion 55 so that the stylus 24 of the contact-type detector 20 is brought into contact with the measurement starting position on the object. The calculated movement course is stored in the program storing portion 54.

Upon receiving a command for starting measurement, the controller 50 operates the relative movement mechanism 40 in accordance with the movement course calculated by the movement course calculating unit and then brings the stylus 24 of the contact-type detector 20 into contact with the object. While the stylus 24 is in contact with the object, the relative movement mechanism 40 is operated to move the contact-type detector 20 relative to the object to measure the surface profile of the object.

Effects of Exemplary Embodiment

According to this exemplary embodiment, the contact-type detector 20 is provided with the stylus 24 that is brought into contact with the surface of an object and the image probe 30 that captures the image of the surface of the object. With this arrangement, after the image probe 30 captures the image of the object, the stylus 24 of the contact-type detector 20 can be automatically brought into contact with the measurement area on the object in accordance with the captured image of the object.

In this manner, an operator does not have to set the tip end of the stylus at the measurement starting position on the object while visually checking and adjusting the relative position between the tip end of the stylus and the measurement area on the object as in a typical apparatus. Thus, the stylus 24 can be prevented from interfering with the object while reducing the burden on the operator.

The stylus 24 of the contact-type detector 20 and the image probe 30 are offset from each other in the Z-axis direction and the Y-axis direction respectively by the offset amounts OFz and OFy. Thus, during the measurement, the stylus 24 and the image probe 30 can be prevented from being interfered with each other without providing a mechanism for evacuating one of the stylus 24 and the image probe 30 that is not used for the measurement.

The offset amounts OFx, OFy and OFz between the tip end of the stylus 24 of the contact-type detector 20 and the image probe 30 are stored in the offset amount storing portion 55. These offset amounts stored in the offset amount storing portion 55 are taken into consideration in calculating the movement course of the relative movement mechanism 40 so that the stylus 24 of the contact-type detector 20 is brought into contact with the measurement starting position on the object. Since the relative movement mechanism 40 is moved in accordance with this measurement course, the stylus 24 of the contact-type detector 20 can be accurately brought into contact with the measurement starting position on the object.

For calibrating the offset amount between the stylus 24 of the contact-type detector 20 and the image probe 30, the calibration jig 70 provided with the lattice pattern 74 is used. In the lattice pattern 74, the sub-areas 75A to 75D are divided from one another by the two intersecting straight lines on the surface of the base board 73, and the first diagonal pair of sub-areas 75A and 75C are formed at a higher level than the surface of the second diagonal pair of sub-areas 75B and 75D. In the first calibration measuring step, the stylus 24 of the contact-type detector 20 is moved across the boundaries between the sub-areas 75A to 75D of the calibration jig 70 to measure the positions of the level differences between the sub-areas 75A to 75D. The obtained measurement values of the positions of the level differences are approximated by two first linear lines to obtain the coordinates of the intersection between the first linear lines, thereby obtaining the first reference position P1 of the lattice pattern 74.

In the second calibration measuring step, the image of the sub-areas 75A to 75D of the calibration jig 70 is captured by the image probe 30 (i.e., the boundaries between the sub-areas 75A to 75D are scanned), thereby detecting the edges between the sub-areas 75A to 75D. The straight lines are applied to the obtained detection values of the edges to obtain the coordinates of the intersection between the two straight lines, thereby obtaining the second reference position P2 of the lattice pattern 74.

Finally, in the offset amount calculating step, a difference between the first reference position P1 obtained in the first calibration measuring step and the second reference position P2 obtained in the second calibration measuring step is calculated, thereby obtaining the offset amount between the contact-type detector 20 and the image probe 30.

In this manner, the offset amount between the contact-type detector 20 and the image probe 30 can be accurately obtained with a simple and low-cost arrangement.

Alternatively, only the image probe 30 can be used for the measurement.

For instance, while the width of a line, the diameter of a hole, or the like can be measured by using an image captured by the image probe 30, a dimension in the optical-axial direction of the objective lens 35 (level difference height) or the like can be measured by using the auto-focusing function of the image probe 30.

The relative movement mechanism 40 includes the Y-axis driving mechanism 41 that moves the stage 10 on which the object is mounted in the Y-axis direction, and the X-axis driving mechanism 48 and the Z-axis driving mechanism 44 that move the contact-type detector 20 and the image probe 30 in the X-axis direction and the Z-axis direction. Thus, the relative movement mechanism 40 enables the object and the contact-type detector 20 and the image probe 30 to move in the three dimensional directions, i.e., the X-axis direction, the Y-axis direction and the Z-axis direction that are set perpendicular to one another. Thus, the profile and surface roughness of the object can be measured irrespective of the orientation and attitude of the measurement portion of the object.

Both the contact-type detector 20 and the image probe 30 are attached to the X-slider 47 while being offset from each other. Thus, there can be provided a simple and low-cost structure as compared with a device in which a mechanism is provided for separately moving the contact-type detector 20 and the image probe 30.

The image probe 30 includes the objective lens 35, the LED 36 as a light source being located on the outer periphery of the objective lens 35, and the CCD sensor 37 that receives reflected light from the object that has passed through the objective lens 35. Thus, the CCD sensor 37 can highly accurately obtain the image of the surface of the object through the objective lens 35. In addition, since the LED 36 is located around the objective lens 35, the image probe 30 can be downsized as compared with a case where a lighting device is separately provided.

Modifications (Reference to FIGS. 11 to 14)

The invention is not limited to the above-described exemplary embodiment but may include modification(s) and improvement(s) made within a scope where an object of the invention can be attained.

The arrangement of the calibration jig is not limited to that of the exemplary embodiment. For instance, the calibration pattern formed on the surface of the base board 73 may be a circular pattern 76 having a circular area 77A at the center thereof, either the outside or inside (in this example, inside) of the circular area 77A being located at a higher level than the surface of the other (in this example, an outside area 77B).

Figure 12:
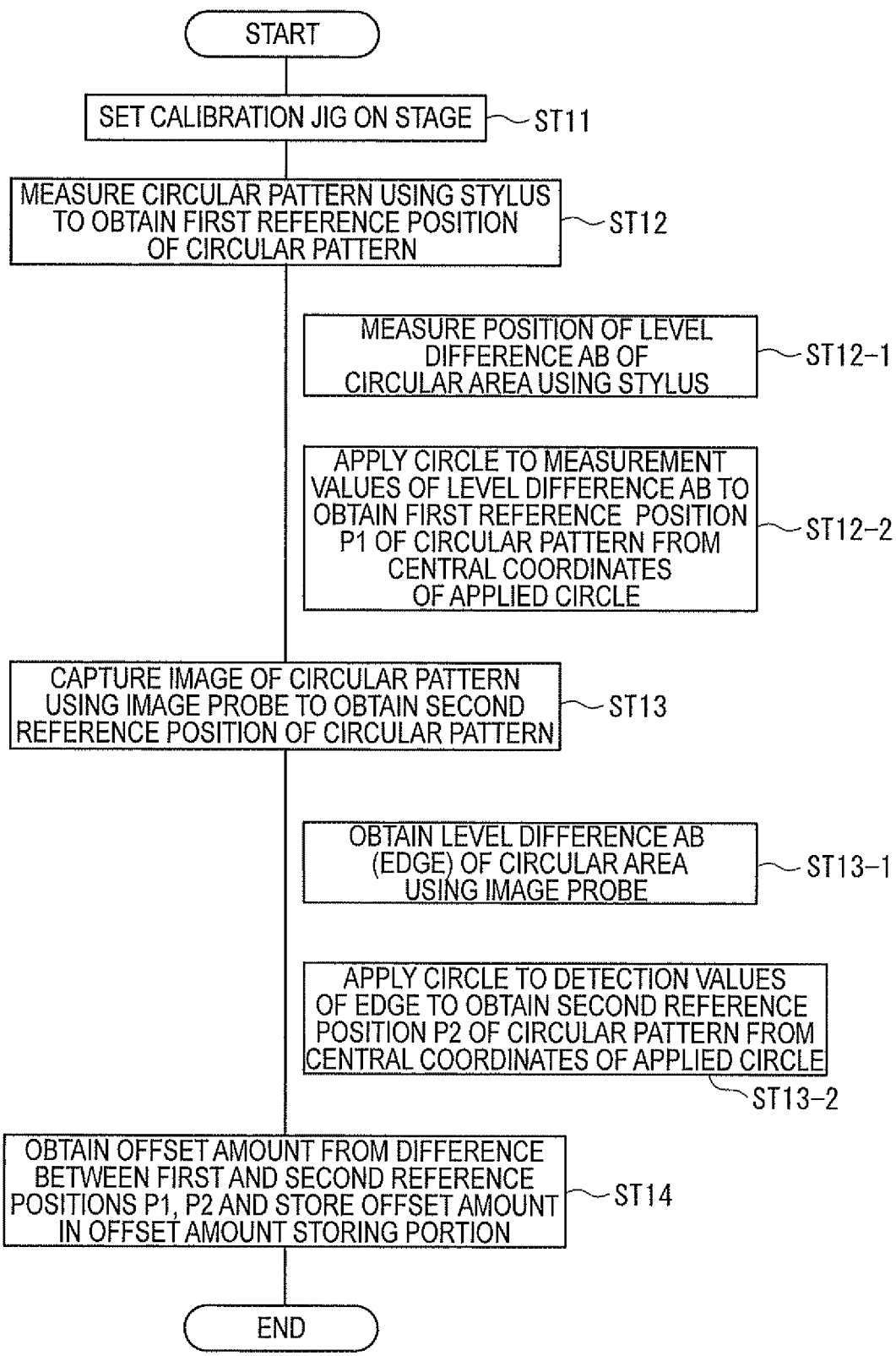
FIG. 12 is a flow chart showing a process of an offset amount calibrating method by using the calibration jig shown in FIG. 11.
Figure 13:
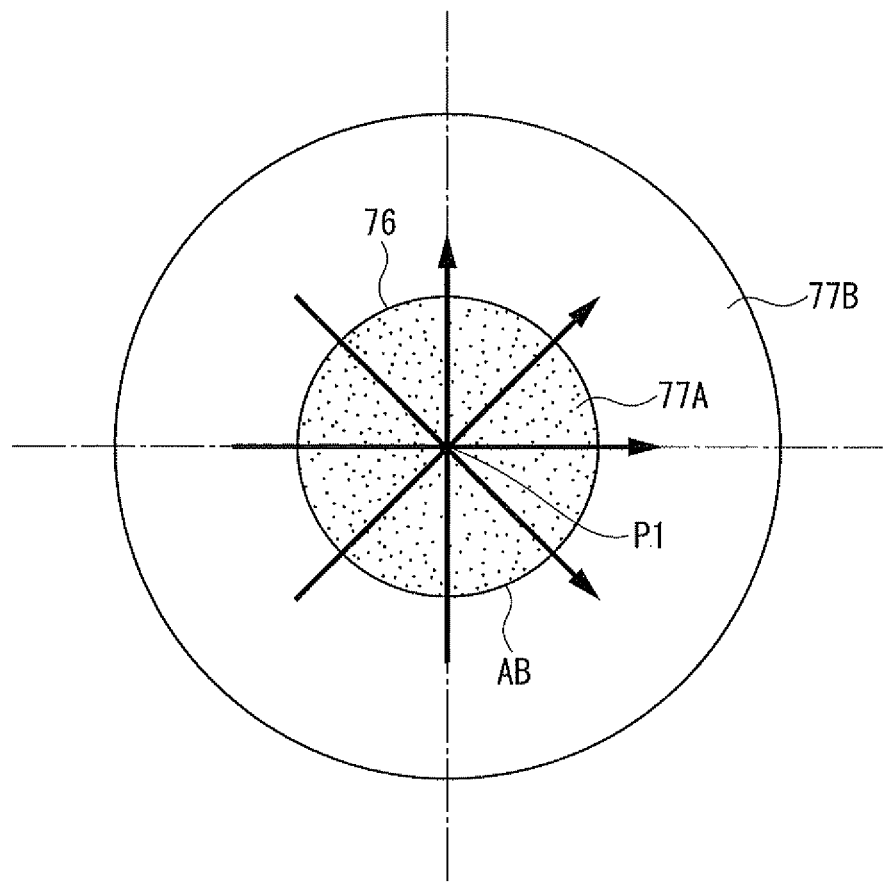
FIG. 13 shows a first measuring step by using the calibration jig shown in FIG. 11.

A process for obtaining the offset amount between the contact-type detector 20 and the image probe 30 by using the calibration jig 80 provided with the circular pattern 76 is performed in accordance with the flow chart shown in FIG. 12.

In ST 11, the calibration jig 80 is set on the stage 10 (calibration jig setting step).

In ST 12, the circular pattern 76 of the calibration jig 80 is measured by the stylus 24 of the contact-type detector 20 to obtain the reference position (first calibration measuring step).

Specifically, the stylus 24 of the contact-type detector 20 is moved across the circular area 77A (moved outward from the center of the circular area 77A, for instance) to measure the position of a level difference AB between the circular area 77A and the outside area 77B at a plurality of spots (at least three or more spots) (ST 12-1). The obtained measurement values of the position of the level difference are approximated by a first circle (ideal circle) to obtain the first reference position P1 of the circular pattern 76 from the central coordinates of the first circle (ST 12-2).

In ST 13, the image of the circular pattern 76 of the calibration jig 80 is captured by the image probe 30 to obtain the reference position of the circular pattern 76 (second calibration measuring step).

Figure 14:
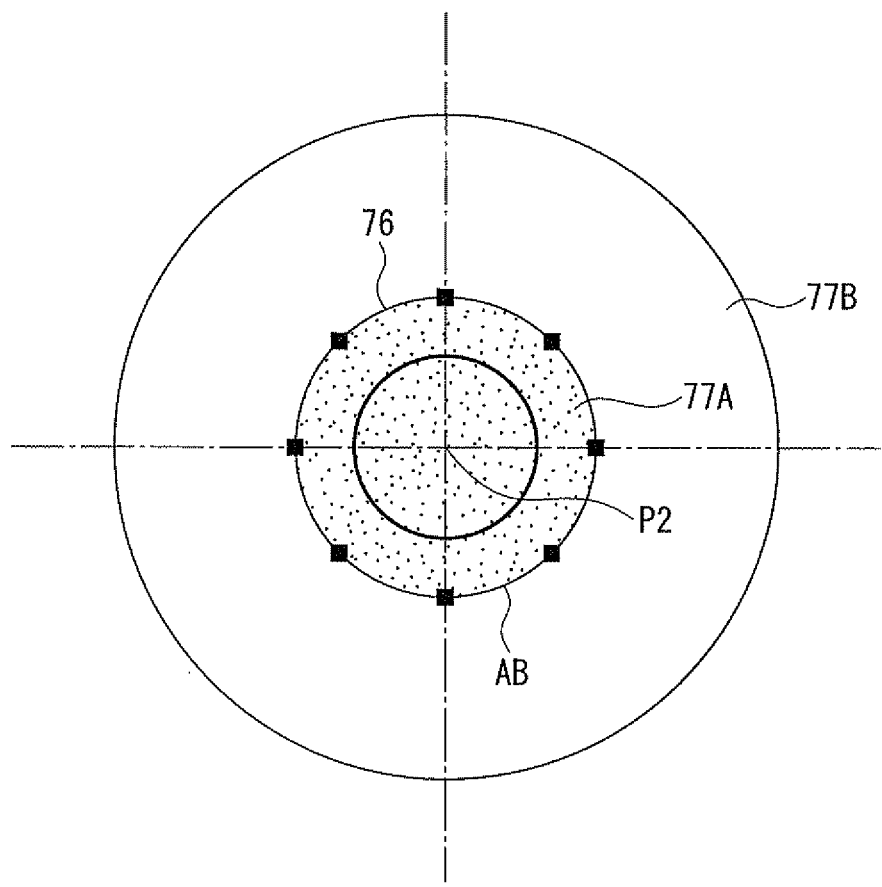
FIG. 14 shows a second measuring step by using the calibration jig shown in FIG. 11.

Specifically, as shown in FIG. 14, the image of the circular area 77A of the calibration jig 80 is captured by the image probe 30 to detect the position of the edge of the circular area 77A, i.e., the position of the level difference AB, at a plurality of spots (at least three or more spots) (ST 13-1). The obtained detection values of the edge are approximated by a second circle (ideal circle) to obtain the second reference position P2 of the calibration pattern from the central coordinates of the second circle (ST 13-2).

In ST 14, a difference between the first reference position P1 obtained in the first calibration measuring step and the second reference position P2 obtained in the second calibrating measuring step is calculated (P1-P2)to obtain an offset amount (offset amount calculating step) and the offset amount is stored in the offset amount storing portion 55.

As described above, the calibration jig 80 is provided with the circular pattern 76 formed on the surface of the base board 73, and the circular pattern 76 including the circular area 77A of which inside or outside is located at a higher level than the surface of the other side. Thus, the offset amount between the contact-type detector 20 and the image probe 30 can be accurately obtained with a relatively simple and low-cost structure.

Though the contact-type detector 20 includes the arm 25 being provided with the stylus 24 at the tip end thereof and the detecting portion 26 that detects the swing amount of the arm 25, the contact-type detector 20 may have any other arrangement as long as the surface profile and roughness of an object can be measured while the stylus 24 is in contact with the object.

Though the image probe 30 includes the probe head 33 being provided with the objective lens 35, the LED 36 as a light source being located on the outer periphery of the objective lens 35 and the CCD sensor 37 that receives reflected light from the object that has passed through the objective lens 35 to capture the image of the object, the invention is not limited thereto.

For instance, the LED 36 as a light source may be provided separately from the image probe. Furthermore, the objective lens 35 may be replaceable so that the objective lens 35 is replaced with one having a different magnification, so that an appropriate operation can be performed depending on the size of the measurement area on the object.

While the relative movement mechanism 40 enables the stage 10 to move in the Y-axis direction and the contact-type detector 20 and the image probe 30 to move in the X-axis direction and the Z-axis direction, the invention is not limited thereto. In other words, as long as the stage 10, and the contact-type detector 20 and the image probe 30 are movable in the three dimensional directions, either one of the stage 10 and the contact-type detector 20 and the image probe 30 may be movable.

Alternatively, the contact-type detector 20 and the image probe 30 may be associated with their respective relative movement mechanisms so that the contact-type detector 20 and the image probe 30 are independently moved.

What is claimed is:

1. An offset amount calibrating method for a surface profile measuring machine including: a stage on which an object is mounted; a contact-type detector being provided with a stylus that is brought into contact with a surface of the object; an image probe that captures an image of the surface of the object; a relative movement mechanism that relatively moves the stage against the contact-type detector and the image probe and moves the contact-type detector and the image probe against the stage; and a controller that controls an operation of the relative movement mechanism and executes processing on measurement data obtained by the contact-type detector and image data obtained by the image probe, the method obtaining an offset amount between the contact-type detector and the image probe, the method comprising:

setting on the stage a calibration jig that has a surface being provided with a calibration pattern with a level difference;

measuring the calibration pattern of the calibration jig by the contact-type detector to obtain a first reference position of the calibration pattern;

capturing an image of the calibration pattern of the calibration jig by the image probe to obtain a second reference position of the calibration pattern; and calculating a difference between the first reference position and the second reference position to obtain the offset amount, wherein the calibration jig includes: a base board; and the calibration pattern having four sub-areas divided by two intersecting straight lines on a surface of the base board, surfaces of a first diagonal pair of the sub-areas being formed at a higher level than surfaces of a second diagonal pair of the sub-areas, the stylus of the contact-type detector is moved across boundaries between the sub-areas of the calibration jig to obtain plural positions of the level difference between the sub-areas and values representing the obtained positions of the level difference are approximated by two first linear lines to obtain the first reference position of the calibration pattern with reference to coordinates of an intersection between the two first linear lines, and an image of the sub-areas of the calibration jig is captured by the image probe to detect plural edges of the sub-areas and values representing the detected edges are approximated by two second linear lines to obtain the second reference position of the calibration pattern with reference to the coordinates of the intersection between the two second linear lines.

2. A surface profile measuring machine comprising:
a stage on which an object is mounted;
a contact-type detector being provided with a stylus that is brought into contact with a surface of the object;
an image probe that captures an image of the surface of the object;

a relative movement mechanism that relatively moves the stage against the contact-type detector and the image probe and moves the contact-type detector and the image probe against the stage;

a controller that controls an operation of the relative movement mechanism and executes processing on measurement data obtained by the contact-type detector and image data obtained by the image probe; and an offset amount storage unit that stores an offset amount obtained by the offset amount calibrating method according to claim 1, wherein the controller includes: a movement course calculating unit that, when a measurement starting position on the object is designated based on the image of the object taken by the image probe, calculates and stores a movement course of the relative movement mechanism in consideration of the offset amount stored in the offset amount storage unit as a compensation value, so that the stylus of the contact-type detector is brought into contact with the measurement starting position on the object; and a stylus setting unit that enables the relative movement mechanism to move along the movement course calculated by the movement course calculating unit.

\* \* \* \* \*